United States Patent [19]

Schmauder, Sr. et al.

[11] 4,186,720

[45] Feb. 5, 1980

[54] SOLAR HEATING PANEL

[75] Inventors: Robert W. Schmauder, Sr.; Robert W. Schmauder, Jr., both of Fleetwood, Pa.

[73] Assignee: Solar Shelter Engineering Inc., Kutztown, Pa.

[21] Appl. No.: 881,448

[22] Filed: Feb. 27, 1978

[51] Int. Cl.² .................................................. F24J 3/02
[52] U.S. Cl. ..................................................... 126/445
[58] Field of Search ............... 126/270, 271; 237/1 A; 165/170, 174

[56] References Cited

U.S. PATENT DOCUMENTS

| | | | |
|---|---|---|---|
| 4,081,026 | 3/1978 | Kleine | 126/271 |
| 4,098,260 | 7/1978 | Goettl | 126/270 |
| 4,116,268 | 9/1978 | Kruger | 165/174 |
| 4,117,828 | 10/1978 | Brownfield | 126/270 |
| 4,122,828 | 10/1978 | Diperi | 126/270 |

FOREIGN PATENT DOCUMENTS 1094368  3/1955  France ..................................... 126/271

Primary Examiner—James C. Yeung
Attorney, Agent, or Firm—Seidel, Gonda, Goldhammer & Panitch

[57] ABSTRACT

A solar heating panel, wherein the moving fluid is air, has a plurality of U-shaped flow paths from the inlet to the outlet. The flow paths are defined by L-shaped collectors which extend between a base sheet and a cover sheet. The cover is transparent to solar energy.

5 Claims, 3 Drawing Figures

U.S. Patent     Feb. 5, 1980     4,186,720
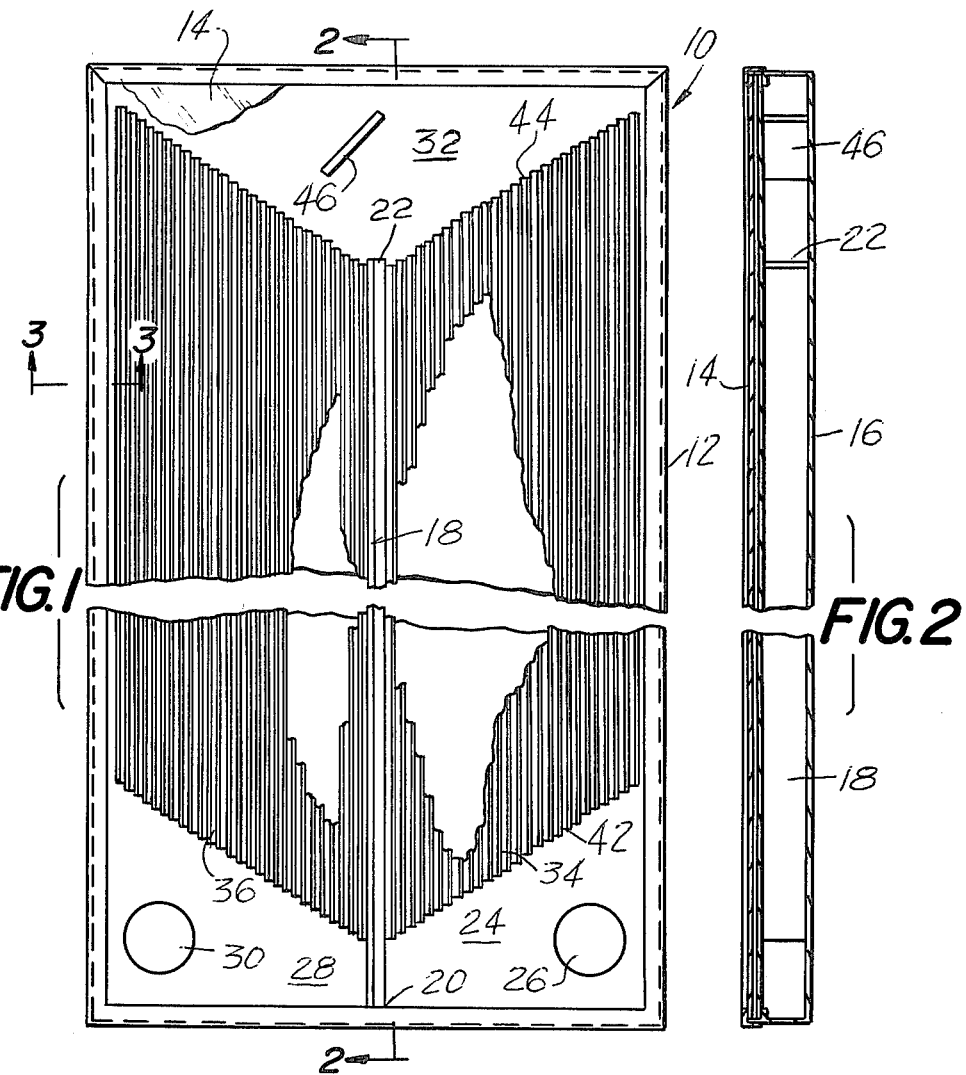
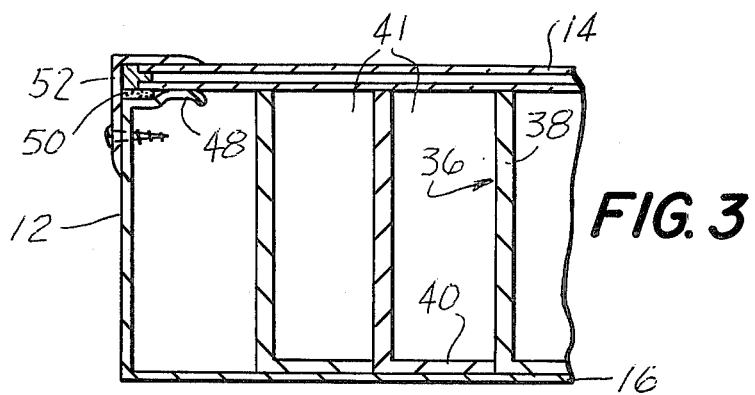

SOLAR HEATING PANEL

BACKGROUND

Solar heating panels where the moving fluid is air are known. For example, see U.S. Pat. No. 3,987,786. The panels as disclosed in said patent have a number of drawbacks including high expense for the collector cups, high pressure drop, and relatively low efficiency. A comparison test between the panel of the present invention and the panel in said patent revealed that the collectors of the present invention had temperatures ranging from 4° to 13° F. greater than the temperature of the collectors disclosed in said patent.

SUMMARY OF THE INVENTION

The solar heating panel of the present invention includes a rectangular elongated housing having one major face which is transparent to solar energy and a base sheet on the opposite major face. A partition is disposed between said major faces within said housing. The partition is shorter than the length of the housing and thereby divides the interior of the housing into an inlet chamber and an outlet chamber. The inlet chamber is provided with an inlet adjacent one end of the housing. The outlet chamber is provided with an outlet adjacent said one end of the housing. The inlet and outlet chambers communicate with one another adjacent the other end of said housing. Collectors divide each of the chambers into discrete parallel paths which are 4 to 8 times higher than the width of the paths.

It is an object of the present invention to provide a solar heating panel which is simple, easy to construct, requires little maintenance, and which is more efficient than those proposed heretofore.

For the purpose of illustrating the invention, there is shown in the drawings a form which is presently preferred; it being understood, however, that this invention is not limited to the precise arrangements and instrumentalities shown.

FIG. 1 is a top plan view of a solar heating panel in accordance with the present invention with a portion of the transparent cover on one major face being broken away for purposes of illustration.

FIG. 2 is a sectional view taken along the line 2—2 in FIG. 1.

FIG. 3 is a sectional view taken along the line 3—3 in FIG. 1 and on an enlarged scale.

Referring to the drawings in detail, wherein like numerals indicate like elements, there is illustrated a solar heating panel in accordance with the present invention designated generally as 10.

The panel 10 is elongated and rectangular in plan view as shown in FIG. 1. The panel 10 includes a rectangular frame 12 having a cover 14 which is transparent to solar energy. The cover 14 is preferably a sealed glass unit having two layers of glass spaced from one another by an evacuated gap. The other major face of the housing is defined by a metallic base sheet 16.

Within the housing 12, there is provided a partition wall 18 which is shorter than the length of the housing. One end of the partition wall 18 is identified by the numeral 20 and the other end thereof is identified by the numeral 22. The partition wall 18 extends from the base sheet 16 to the cover 14. Wall 18 is preferably Z-shaped in section so as to have a flange sealed to cover 14 and a flange sealed to sheet 16. Thus, the partition wall 18 divides the interior of the housing 12 into an inlet chamber 24 and an outlet chamber 28 interconnected adjacent end 22 by a connecting passage 32. The inlet chamber 24 is provided with an inlet 26 in any convenient location but preferably in the base sheet 16. Likewise, the outlet chamber 28 is provided with an outlet 30 in any convenient place but preferably in the base sheet 16.

Flow from the inlet 26 to the outlet 30 is a U-shaped flow path defined by chamber 24, passage 32, and chamber 28. It will be noted that the inlet 26 and outlet 30 are adjacent one end of the housing 12 and that chambers 24, 28 communicate with one another adjacent the opposite end of the housing 12.

The chambers 28 and 24 are parallel. Within chamber 24, there is provided collectors 34. Within chamber 28, there is provided collectors 36. The collectors 34, 36 divide their respective chambers into a plurality of parallel flow paths. Since the collectors are identical, only collectors 36 will be described in detail.

Referring to FIG. 3, it will be noted that the collectors 36 are generally L-shaped in cross-section. Each collectors is identical to the next adjacent collector. Each collector 36 has a vertical leg 38 and a horizontal leg 40. The vertical leg 38 has a height dimension which is at least 4 and as high as 8 times the width dimension of the leg 40. Thus, each of the rectangular parallel flow paths 41 has a height which is 4 to 8 times as great as its width. In a preferred embodiment, leg 38 is 4 inches high and leg 40 is ¾ inch wide. The collectors are made from a non-corrosive heat conductive metal such as aluminum. Leg 40 of each collector 36 is adhesively bonded to the base sheet 16 or otherwise joined thereto so as to fixedly locate the collectors in the disposition illustrated. If desired, the collectors 34 and/or 36 could be extruded as a one-piece unit and cut along the bias lines.

In the disposition illustrated in FIG. 1, the collectors 34 are all of the same length but arranged so as to have a bias line 42 adjacent inlet 26 and a bias line 44 adjacent passage 32. The bias lines 42, 44 promote uniform flow through each of the passages defined by the collectors 34. It will be noted that the collectors 36 have a similar bias line adjacent passage 32 and a similar bias line adjacent the outlet 30. The bias lines for the collectors 34, 36 adjacent the passage 32 provides for uniform flow through said flow paths. Passage 32 is provided with a baffle 46 which distributes the flow of air uniformly to the various paths 41.

The transparent cover 14 may be applied in any suitable manner. As illustrated in FIG. 3, the housing 12 has an inwardly extending flange 48. A suitable cement 50 provides a seal between flange 48 and the cover 14. A clamp 52 has one leg overlying the cover 14 and another leg overlying the side wall of the housing 12. Threaded fasteners may be utilized to retain the clamp 52 in position.

The solar heating panel 10 of the present invention has the following advantages. Air flow is balanced from the inlet to the outlet. The pressure drop is extremely low and on the order of 0.04 inches of water with a flow rate of 4 cubic feet per minute per square foot of collector. Except as high noon, the collectors 34 and 36, due to their high height to width ratio, trap more solar energy whereby the collectors are hotter than competitive prior art collectors such as that disclosed in U.S. Pat. No. 3,987,786. With a low pressure drop of 0.04 inches of static pressure, the horsepower requirements for moving air through the panel 10 are substantially lower thereby decreasing the cost of the panel. Since each collector 34 or 36 abuts the next adjacent collector, the collectors define three sides of the rectangular flow path 41 with the remaining side being defined by the transparent cover 14.

The present invention may be embodied in other specific forms without departing from the spirit or essential attributes thereof and, accordingly, reference should be made to the appended claims, rather than to the foregoing specification, as indicating the scope of the invention.

I claim:

1. A solar heating panel comprising an elongated rectangular housing having one major face transparent to solar energy and a base sheet on the opposite major face, a partition between said faces in said housing, said partition being shorter than the length of said housing and extending from one end of the housing, said partition dividing the enterior of the housing into an inlet chamber and an outlet chamber, an inlet to said inlet chamber and outlet to said outlet chamber, the inlet and outlet being adjacent said one end of the housing, a connecting passage between said chambers adjacent the other end of said housing, heat collectors dividing each of said chambers into discrete parallel paths which are about 4 to 8 times higher than the width of the paths, said flow paths being open at each end thereof whereby a fluid may flow from the inlet through the flow paths of the outlet chamber to the outlet, each of the collectors being L-shaped in cross section with its short leg being secured to the base sheet and abuting the lower end of the long leg of the next adjacent collector, each long leg of each collector extending from the base sheet to said first major face, the collectors in the inlet chamber and in the outlet chamber being of the same length, the ends of the collectors being arranged on a bias to evenly distribute air flow from the inlet to said flow paths in the inlet chamber, the ends of said collectors being arranged at a bias from one end of said partition to a corner of said housing to thereby define an edge of said connecting passage, said connecting passage being free from said collectors.

2. A panel in accordance with claim 1 wherein a baffle is provided within the connecting passage at an angle of about 45 degrees with respect to said partition, said connecting passage being partly in the outlet chamber and partly in the inlet chamber, said baffle being in the outlet chamber portion of the connecting passage.

3. A panel in accordance with claim 1 whereby said collectors define said flow paths so that the height of the flow path is approximately 5.3 times greater than the width of the flow path.

4. A solar heating panel for use with air as the moving fluid comprising a rectangular elongated housing having a cover transparent to solar energy on one major face thereof, said housing having an air inlet and an air outlet adjacent one end thereof, means dividing the interior of said housing into a U-shaped flow path beginning at said inlet and terminating at said outlet, each leg of said flow path being divided into a plurality of parallel flow passages by L-shaped collectors, the bight of said flow path being free from any of said collectors, said collectors abutting one another so as to define three sides of each flow passage, said cover defining the fourth side of said passages, said passages having a height about 5 times greater than their width, and means for balancing flow from the inlet to said passages.

5. A solar heating panel comprising an elongated rectangular housing having one major face transparent to solar energy and a base sheet on the opposite major face, a partition between said faces in said housing, said partition being shorter than the length of said housing, said partition dividing the interior of the housing into an inlet chamber and an outlet chamber, an inlet to said inlet chamber, an outlet to said outlet chamber, said inlet and outlet being adjacent one end of the housing, a connecting passage between said chambers adjacent the other end of said housing, heat collectors dividing each of said chambers into discrete parallel flow paths which are about 5 to 6 times higher than the width of the paths, said flow paths being open at each end thereof whereby a fluid may flow from the inlet through the flow paths of the inlet chamber to the connecting passage and then through the flow paths in the outlet chamber to the outlet, each of the collectors being L-shaped in cross-section with its short leg being secured to the base sheet and its long leg extending from the base sheet to one major face, a baffle provided within the connecting passage at an angle of about 45° with respect to said partition, the collectors in the inlet chamber and in the outlet chamber being of the same length, and the ends of the collectors being arranged on a bias to evenly distribute air flow from the inlet to said flow paths in the inlet chamber, and the ends of said collectors being arranged at a bias from one end of said partition to a corner of said housing to thereby define an edge of said connecting passage.

* * * * *